(12) United States Patent
Inoue et al.

(10) Patent No.: US 7,662,903 B2
(45) Date of Patent: Feb. 16, 2010

(54) THERMOPLASTIC POLYIMIDE AND IMIDE OLIGOMER

(75) Inventors: Shinsuke Inoue, Hiroshima (JP); Satoru Nanba, Hiroshima (JP); Noriyuki Kawanishi, Tokyo (JP); Hiroyasu Inagaki, Tokyo (JP)

(73) Assignee: Manac Inc., Hiroshima (JP)

(*) Notice: Subject to any disclaimer, the term of this patent is extended or adjusted under 35 U.S.C. 154(b) by 817 days.

(21) Appl. No.: 10/528,530

(22) PCT Filed: Sep. 18, 2003

(86) PCT No.: PCT/JP03/11873

§ 371 (c)(1),
(2), (4) Date: Mar. 18, 2005

(65) Prior Publication Data

US 2006/0247411 A1    Nov. 2, 2006

(30) Foreign Application Priority Data

Sep. 18, 2002  (JP) ............................. 2002-271445
Feb. 14, 2003  (JP) ............................. 2003-37344

(51) Int. Cl.
*C08G 73/10*  (2006.01)
*C08G 73/00*  (2006.01)

(52) U.S. Cl. .................... 528/170; 528/271; 528/272; 528/288

(58) Field of Classification Search .................. 528/170, 528/271, 272, 288
See application file for complete search history.

(56) References Cited

U.S. PATENT DOCUMENTS

| | | | |
|---|---|---|---|
| 4,048,142 A | 9/1977 | Takeoshi | |
| 4,925,915 A | 5/1990 | Mueller et al. | |
| 6,204,394 B1 | 3/2001 | Sakata et al. | |

FOREIGN PATENT DOCUMENTS

| | | |
|---|---|---|
| JP | 63-75034 A | 4/1988 |
| JP | 1-167332 | 7/1989 |
| JP | 2001-323062 A | 11/2001 |
| JP | 2001-323064 A | 11/2001 |
| JP | 2001-323065 A | 11/2001 |
| JP | 2001-323066 A | 11/2001 |
| JP | 2001-323067 A | 11/2001 |
| JP | 2003-155343 A | 5/2003 |
| JP | 2003-213130 A | 7/2003 |
| WO | WO-99/28287 | 6/1999 |

OTHER PUBLICATIONS

Sakata et al; Crosslinkable group containing polyimide precursor for heat resistant adhesive; 2001; Mitsui Chemicals inc., Japan; chem Abstract 136: 7165.*
Sakata et al; Crosslinkable group containing polyimde precursor fro heat resistant adhesive; 2001; Mitsui Chemicals Inc., Japan; Chem Abstract 136: 7164.*
Sakata et al; Crosslinkable group containing polyimide precursor for heat resistant adhesive; 2001; Mitsui Chemicals Inc.; Japan; Chem Abstract 136: 7161.*
Sakata et al; Crosslinkable group containing polyimide precursor for heat resistant adhesive; 2001; Mitsui Chemiclas. Inc.; Japan; Chem Abstract 136: 7160.*
Sakata et al; Crosslinkable group containign polyimide precursor for heat resistant adhesive; Mitsui Chemicals Inc.; Japan; Chem Abstract 136: 7159.*
Japanese Office Action for patent application No. 037344/2003 issued Aug. 26, 2008, and English translation thereof, 7 pages.
English Abstract for Japanese patent application, Publication No. 1167332, from esp@cenet, Publication Date: Jul. 3, 1989, 1 page.
Patent Abstracts of Japan, JP-2003-213130-A, Jul. 30, 2003, Nippon Steel Chemical Co., Ltd.
Patent Abstracts of Japan, JP-2003-155343-A, May 27, 2003, Kaneka Corp.
Patent Abstracts of Japan, JP-2001-323062-A, Nov. 20, 2001, Mitsui Chemicals, Inc.
Patent Abstracts of Japan, JP-2001-323064-A, Nov. 20, 2001, Mitsui Chemicals, Inc.
Patent Abstracts of Japan, JP-2001-323065-A, Nov. 20, 2001, Mitsui Chemicals, Inc.
Patent Abstracts of Japan, JP-2001-323066-A, Nov. 20, 2001, Mitsui Chemicals, Inc.
Patent Abstracts of Japan, JP-2001-323067-A, Nov. 20, 2001, Mitsui Chemicals, Inc.
Patent Abstracts of Japan, JP-63-75034-A, Apr. 5, 1988, Director General, Agency of Industrial Science and Technology.
A partial English translation of JP2001-323062 dated Nov. 20, 2001 (5 pages).

* cited by examiner

*Primary Examiner*—Duc Truong
(74) *Attorney, Agent, or Firm*—Osha • Liang LLP

(57) ABSTRACT

A thermoplastic polyimide having good processing characteristics, obtainable by polymerizing an acid component and a diamine component, wherein an aromatic tetracarboxylic acid dianhydride represented by formula (I):

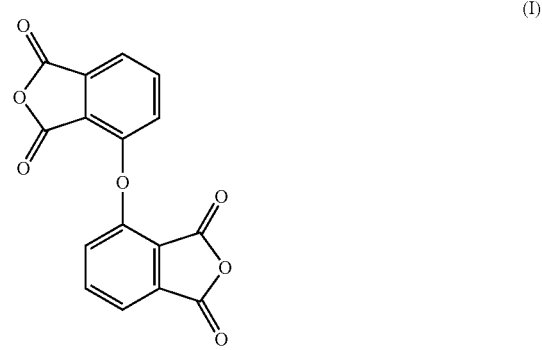

(I)

or its derivative is used at least as a part of the acid component.

11 Claims, No Drawings

THERMOPLASTIC POLYIMIDE AND IMIDE OLIGOMER

TECHNICAL FIELD

The present invention relates to a novel thermoplastic polyimide and imide oligomer useful as prepregs, insulating materials, matrix materials of heat resistant fiber, molded parts, heat resistant adhesives, films thereof and various functional materials, to their precursors, namely, a polyamic acid and an amic acid oligomer.

TECHNICAL BACKGROUND

Polyimides represented by KAPTON (manufactured by Du Pont Co., Ltd.) and VESPEL (manufactured by Du Pont Cp., Ltd.) generally have excellent heat resistance, mechanical properties, chemical resistance, flame retardant properties and electric properties. Therefore, polyimides are widely used as a film to flexible print substrates and electric wire-covering materials, and as a molding material to functional materials for engine surrounding parts and electric and electronic parts in automobile industries or airplane industries. These polyimides, however, have a defect in inferior processing characteristics. The first effect of the defect is as follows. Since the polyimides have no thermoplasticity, they are difficult to be subjected to injection molding or extrusion molding, which molding is used in usual polymers, and they are molded by powder sintering and provided to user by part unit. Therefore, the forms of molded articles are limited and they are very expensive. The second effect thereof is as follows. Since the polyimides are insoluble in most of solvents, when they are used to coating materials or films such as adhesives or the like, they must be formed and processed in the step of polyamic acids and thereafter imidized thermally or chemically.

Further, the polyamic acid, which is a precursor of the polyimide, is easily changed with time in the air and has a possibility such that the capability of a resin of polyamic acid after processing cannot be sufficiently exhibited. At the same time, the imidization reaction is performed with water elimination, and so it is apt to be a cause of formation of voids in films and cracks in molding materials. Until now, many studies on expressing the properties of solubility/infusibility, insolubility fusibility, or solubility/fusibility have been done in order to give the forming processing characteristics to polyimides. However, many polyimides having the characteristics have not been prepared until now.

Accordingly, in the electric and electronic fields and the airplane industry and transportation apparatus fields, the development of polyimides having thermoplasticity, excellent high-temperature fluidity, soluble in solvents, capable of being in various forms such as structure materials films, fiber or varnish, and also having excellent heat resistance, mechanical strength, chemical resistance and electric insulating properties has been desired.

As described above, the first object of the present invention is to provide a novel polyimide and a novel imide oligomer, having thermoplasticity, which is favorable for forming processing, preferably also having solubility in solvents, and to provide their precursors, namely, a polyamic acid and an amic acid oligomer.

The second object of the present invention is to provide a novel polyimide and a novel imide oligomer, having such properties that in the beginning, they have thermoplasticity, which is favorable for forming processing, preferably also have solubility in solvents, and after heat treatment, they have heat resistance, mechanical properties, chemical resistance, flame retardant properties and electric properties, which are comparable to thermosetting polyimides, and to provide their precursors, namely, a polyamic acid and an amic acid oligomer.

DISCLOSURE OF THE INVENTION

The present inventors have been earnestly studied and found that the first object is attained by using a prescribed acid component and the second object is attained by the combined use of a prescribed acid component and a prescribed sealing agent. Thus, the present invention has been accomplished.

Specifically, the present inventors found that in the case of using a diamine containing an aromatic ring, the resulting ones hardly exhibit thermoplasticity and tend to be insoluble in solvents, but in the case of using a diamine containing an aromatic ring with simultaneous use of a prescribed acid component, the resulting ones exhibit thermoplasticity and also soluble in solvents. Additionally, the present inventors found that by the combined use of a diamine containing an aromatic ring and a prescribed polymer end-sealing agent, a polyimide having excellent heat resistance can be prepared by heat-treatment and then the present invention has been accomplished.

Present invention (1) is thus a thermoplastic polyimide or imide oligomer obtainable by polymerizing an acid component and a diamine component, wherein at least one part of the acid component comprises an aromatic tetracarboxylic acid dianhydride represented by formula (I):

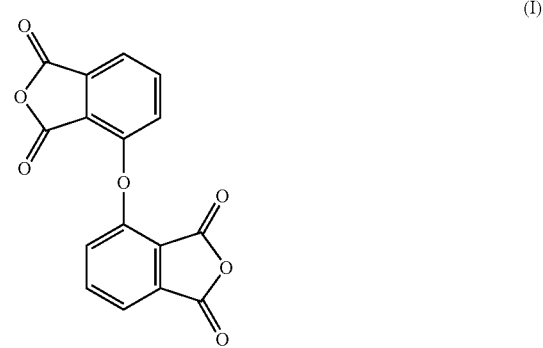

(I)

or its derivative.

Present invention (2) is the thermoplastic polyimide or imide oligomer according to present invention (1) wherein at least a part of the diamine component comprises a diamine represented by formula (II):

$$H_2N-R-NH_2 \quad (II)$$

wherein, R is a substituted or unsubstituted bivalent organic group having an aromatic ring and/or aliphatic ring.

Present invention (3) is the thermoplastic polyimide or imide oligomer according to the second present invention (2) wherein R is a bivalent organic group having an aromatic ring.

Present invention (4) is the thermoplastic polyimide or imide oligomer according to present invention (3) wherein R contains at least three aromatic rings.

Present invention (5) is the thermoplastic polyimide or imide oligomer according to any one of present inventions (1)-(4) wherein an aromatic tetracarboxylic acid dianhydride represented by formula (III);

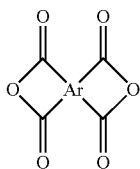

in which Ar is a quadrivalent organic group having an aromatic ring, or its derivative, different from the aromatic tetracarboxylic acid dianhydride represented by formula (I) and the derivative thereof, is further used as an acid component.

Present invention (6) is a solution or suspension containing the polyimide or imide oligomer as claimed in any one of present inventions (1)-(5).

Present invention (7) is a polyamic acid or amic acid oligomer, which is a precursor of the polyimide or imide oligomer as claimed in any one of present inventions (1)-(5).

Present invention (8) is a solution or suspension containing the polyamic acid or amic acid oligomer as claimed in present invention (7).

Present invention (9) is a thermoplastic polyimide or imide oligomer obtainable by polymerizing an acid component and a diamine component and exhibiting thermosetting properties in a high temperature region wherein at least a part of the acid component comprises an aromatic tetracarboxylic acid dianhydride represented by formula (I);

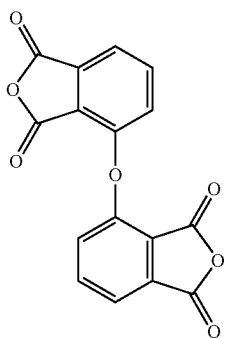

or its derivative, and as a polymer molecule end-capping agent, a dicarboxylic acid dianhydride having a triple bond in molecule or a mono-amine is used.

Present invention (10) is the thermoplastic polyimide or imide oligomer according to present invention (9) wherein the polymer molecule end-capping agent is a compound represented by formula (IV);

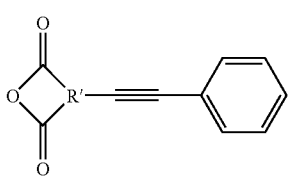

in which R' is a trivalent organic group having 6 to 30 carbon atoms which is a monocyclic aromatic group, a condensed polycyclic aromatic group or a non-condensed polycyclic aromatic group where aromatic groups are linked with each other directly or through a linking member, and any aromatic rings in formula (IV) may be unsubstituted or substituted.

Present invention (11) is a thermoplastic polyimide or imide oligomer according to present invention (9) or (10) wherein at least a part of the diamine component comprises a diamine represented by formula (II);

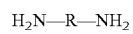

in which R is a substituted or unsubstituted bivalent organic group having an aromatic and/or aliphatic ring(s).

Present invention (12) is the thermoplastic polyimide or imide oligomer according to present invention (11) wherein R is a bivalent organic group having an aromatic ring.

Present invention (13) is the thermoplastic polyimide or imide oligomer according to present invention (12) wherein R has at least three aromatic rings.

Present invention (14) is the thermoplastic polyimide or imide oligomer according to any one of present inventions (9)-(13) wherein an aromatic tetracarboxylic acid dianhydride represented by formula (III);

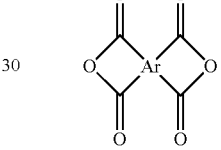

in which Ar is a quadrivalent organic group having an aromatic ring, or its derivative, different from the aromatic tetracarboxylic acid dianhydride represented by formula (I) and the derivative thereof, is further used as an acid component.

Present invention (15) is a thermosetting polyimide or imide oligomer obtainable by heat-treating the polyimide of any one of present inventions (9)-(14).

Present invention (16) is a solution or suspension containing the polyimide or imide oligomer of any one of present inventions (9)-(14).

Present invention (17) is a polyamic acid or amic acid oligomer, which is a precursor of the polyimide or imide oligomer of any one of present inventions (9)-(14).

Present invention (18) is a solution or suspension containing the polyamic acid or amic acid oligomer as claimed in present invention (17).

Present invention (19) is a thermosetting polyimide or amic acid oligomer obtainable by heat-treating the polyamic acid of present invention (18).

BEST MODE FOR CARRYING OUT THE INVENTION

First, the terms used in the preset specification are described. The "aromatic ring" in formulas (II) and (III) comprises monocyclic, bicyclic or tricyclic aromatic hydrocarbon groups having 6 to 14 atoms such as phenyl, 1-naphthyl, 2-naphthyl, 9-antracyl; and heterocyclic aromatic groups having 1 to 3 hetero atoms (i.e. oxygen, sulfur or nitrogen) and carbon atoms other than the hetero atoms in the ring, such as furanyl, thienyl, pyridyl, pyrolyl, N-alkylpyrolo, pyrimidyl, pyradinyl, imidazolyl, benzofranyl, quinolinyl and indolyl. The "aliphatic ring" in formula (II) comprises monocyclic, crosslinking cyclic or spiro cyclic aliphatic hydrocarbons having 3 to 10 atoms, preferably 3 to 6 cyclic atoms such as cyclohexyl, norbornyl and spiro[4,5]decyl; and monocyclic, crosslinking cyclic and spiro cyclic aliphatic hydrocarbons having 1 to 3 hetero atoms (i.e. oxygen, sulfur or nitrogen) and carbon atoms other than the hetero atoms in the ring, such as pyperidyl. In formulas (I) to (IV), "substitution" concerning aromatic rings or aliphatic rings means that all or a part of hydrogen atoms present in the aromatic ring or aliphatic ring is independently each other substituted by a group selected from alkyl, halogenated alkyl, halogen, cycloalkyl, nitro, cyano, or optionally substituted phenyl, —$OR_1$ (in which $R_1$ is hydrogen, alkyl, halogenated alkyl, cycloalkyl or optionally substituted phenyl), acyl and —$COOR_2$ (in which $R_2$ is hydrogen or alkyl). Herein, the alkyl, halogenated alkyl, cycloalkyl or acyl means a linear, branched chain or cyclic group having 1 to 10 carbon atoms and further each may be optionally substituted with at least one substituent, such as halogen, aryl, hydroxy, alkoxy, carboxy, oxo and cycloalkyl, and further at least one or more of oxygen, sulfur and substituted or unsubstituted nitrogen atoms may be inserted in the alkyl chain. Typical examples of the alkyl group may include methyl, ethyl, i-propyl, n-butyl, t-butyl, n-pentyl, heptyl, benzyl and octyl. Examples of the halogen may include fluorine, chlorine, bromine and iodine. Further, as a substituent, alkyl group, halogenated alkyl group, halogen atom, alkoxyl group or halogenated alkoxyl group is preferable.

In formulas (I) and (III), the term "its derivative" concerning the tetracarboxylic acid dianhydride is a general idea including above mentioned anhydride where at least one aromatic ring is substituted by at least one of the above substituents (hereinafter referred to as "substituted anhydrides"), the above mentioned anhydride or substituted anhydride which is opened in a part and/or all of the rings, and that a part and/or all of carboxyl group resulted from being opened is esterified. The alcohol for the esterification is not particularly limited. Examples thereof can be quoted as hydrocarbon alcohols such as methanol, ethanol, propanol and the like, and aromatic alcohols such as phenol, cresol and the like.

The "poly" in polyimide and polyamic acid indicates ones having a polymerization degree of at least 20, preferably not more than 600, and the "oligomer" in imide oligomer and amic acid oligomer indicates ones having a polymerization degree of not less than 2 and less than 20.

The high temperature region is a region from the temperature at which the heat crosslinking reaction of a carbon-carbon triple bond derived from the polymer molecule end-sealing agent, present in the end of thermoplastic polyimide or imide oligomer, is started to the temperature at which the polyimide or imide oligomer is not thermally denatured, for example, thermal decomposition temperature.

Next, the acid component, which is a material of the polyimide according to the present invention, is explained. The present invention is characterized by using an aromatic tetracarboxylic acid dianhydride represented by formula (I)

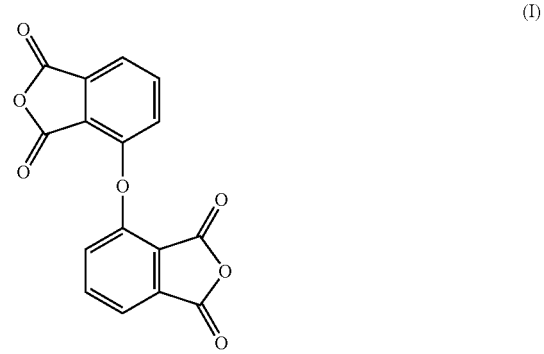

or its derivative as at least one part of the acid component.

The compound represented by formula (I) is a known compound and is obtainable by, for example, the method as described in Patent Publication JP-B-3204641.

As the acid component, the compound of formula (I) and its derivative may be used singly or used in combination with two or more kinds. Of the acid components, the total of the compounds represented by formula (I) is preferably not less than 1 mol %, more preferably not less than 30 mol %, specifically not less than 50 mol %.

The other acid components are not particularly limited as long as it does not deviate from the content of the present invention, such as an aromatic tetracarboxylic acid dianhydride represented by formula (III);

in which Ar represents a quadrivalent organic group having an aromatic ring, or its derivative, different from the aromatic tetracarboxylic acid dianhydride represented by formula (I) and the derivative thereof.

As the quadrivalent organic group, aromatic groups represented by formula (V);

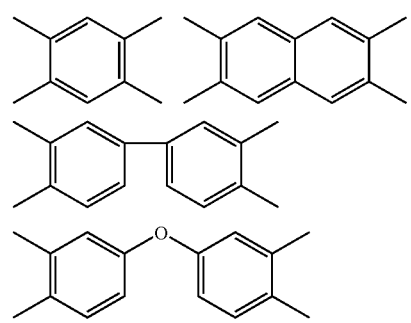

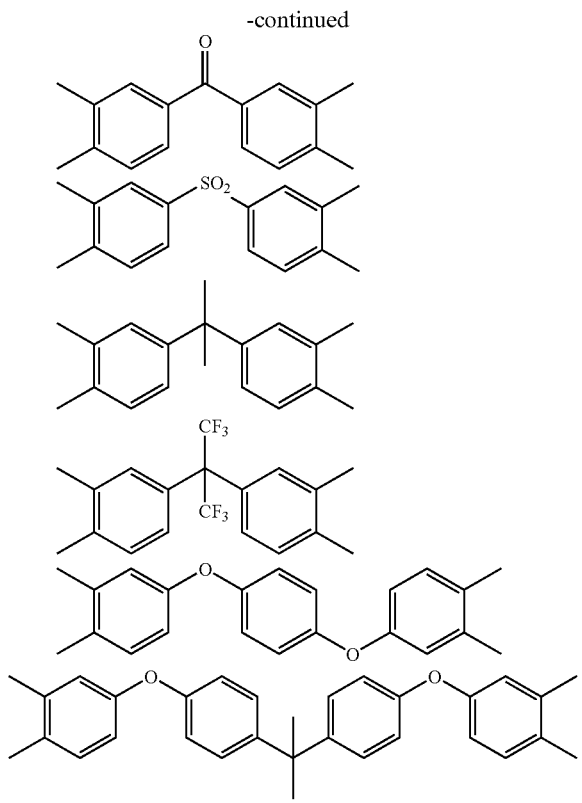

can be quoted as examples.

Examples of such compounds and derivatives thereof can be quoted as pyromellitic acid dianhydride, 3,3',4,4'-biphenyl tetracarboxylic acid dianhydride, 2,2'3,3'-biphenyl tetracarboxylic acid dianhydride, 3,3',4,4'-benzophenone tetracarboxylic acid dianhydride, 2,2',3,3'-benzophenone tetracarboxylic acid dianhydride, 3,3',4,4'-oxydiphthalic acid dianhydride, 3,3'4,4'-diphenylsulfone tetracarboxylic acid dianhydride, 2,3,6,7-naphthalene tetracarboxylic acid dianhydride, 1,2,4,5-naphthalene tetracarboxylic acid dianhydride, 1,4,5,8-naphthalene tetracarboxylic acid dianhydride, 1,3,5,6-naphthalene tetracarboxylic acid dianhydride, 4,4'-(isopropylidene)diphthalic acid dianhydride, 4,4'-(hexa-fluoroisopropylidene)diphthalic acid anhydride, 4,4'-(4,4'-isopropylidene diphenoxy)bisphthalic acid dianhydride and 4,4'-(4,4'-hexafluoroisopropylidene diphenoxy)bisphthalic acid dianhydride, and further as these compounds where all or a part of hydrogen atoms on an aromatic ring(s) have been substituted by other substituents such as alkyl group, halogenated alkyl group, halogen atom, alkoxyl group, halogenated alkoxyl group or the like. They may be used singly or in combination of the plural. These aromatic tetracarboxylic acid dianhydrides are known compounds and commercially available, for example, PMDA (manufactured by Daicel Chemical Co., Ltd, and BPDA (manufactured by Ube Kosan Co., Ltd.).

Next, the diamine component, which is a raw material of the polyimide, of the present invention is described. Although the diamine used in the present invention is not particularly limited, it is preferred to use, as this diamine component, a diamine represented by formula (II);

$$H_2N-R-NH_2 \quad (II)$$

wherein, R is a substituted or un-substituted bivalent organic group having aromatic and/or aliphatic rings. Here, preferable R is a bivalent organic group having an aromatic ring(s), more preferably having at least three aromatic rings (furthermore preferably 3 to 6 aromatic rings), such as, terphenyl. Further, they may be used singly or in combination with two or more kinds.

Concretely, in the case that R is a group having an aromatic ring, those having one aromatic group can be quoted as 1,4-phenylene diamine, 1,3-phenylene diamine, 2,4-diamino toluene, xylene diamine, diamino naphthalenes and diaminoantracenes;

as those having two aromatic groups can be quoted as 2,2-bis(4-aminophenyl)propane, 2-(3-aminophenyl)-2-(4-aminophenyl)propane, 2,2-bis(3-aminophenyl)propane, 4,4'-diaminodiphenylmethane, 3,4'-diaminodiphenylmethane, 3,3'-diaminodiphenylmethane, 4,4'-diaminodiphenylsulfone, 3,4'-diaminodiphenylsulfone, 3,3'-diaminodiphenylsulfone, 4,4'-diaminobenzophenone, 3,4'-diaminobenzophenone, 3,3'-diaminobenzophenone, 4,4'-oxydianiline, 3,4'-oxydianiline and 3,3'-oxydianiline;

as those having three aromatic groups can be quoted as 1,3-bis(3-aminophenoxy)benzene, 1,3-bis(4-aminophenoxy)benzene, 1,4-bis(3-aminophenoxy) benzene, 1,4-bis(4-aminophenoxy)benzene, 1,3-bis(3-aminobenzoyl)benzene, 1,3-bis(4-aminobenzoyl)benzene, 1,4-bis(3-aminobenzoyl)benzene, 1,4-bis(4-aminobenzoyl)benzene, α,α'-bis(4-aminophenyl)-1,4-di-isopropylbenzene; and as those having at least four aromatic groups can be quoted as 4,4'-bis(4-aminophenoxy)benzophenone, 4,4'-bis(3-aminophenoxy)benzophenone, 4,4'-bis(4-aminophenoxy)diphenylsulfone, 4,4'-bis(3-aminophenoxy)diphenylsulfone, 4,4'-bis(4-aminophenoxy)diphenyl, 4,4'-bis(3-aminophenoxy)diphenyl, 2,2-bis(4-(4-aminophenoxy)phenyl)propane, 2,2-bis(4-(3-aminophenoxy)phenyl)propane, 2,2-bis(3-(3-aminophenoxy)phenyl)propane, 4,4'-bis(4-aminophenoxy)diphenylether, 4,4'-bis(3-aminophenoxy)diphenylether, 1,3-bis(4-(3-aminophenoxy)benzoyl)benzene, 4,4'-bis(4-(4-aminophenoxy)benzoyl)diphenylether and 9,9-bis(4-aminophenyl)fluorene.

Further, in the case that R is a group having an aliphatic ring(s), for example, trans and cis-1,4-diamino cyclohexanes, trans and cis-1,3-diaminocyclohexanes, trans and cis-1,2-dimainocyclohexanes, 3-methyl trans and cis-1,4-diaminocyclohexanes, 3-methyl-3-aminomethyl-5,5'-dimethylcyclohexyl amine, 1,3-bisaminomethylcyclohexane, bis-(4,4'-aminocyclohexyl)methane, bis(3,3'-methyl-4,4'-aminocyclohexyl)methane, bis-(aminomethyl)norbornane and bis-(aminomethyl)-tricyclo[5,2,1,0$^{2.6}$]decane, can be quoted.

The polymer molecule end-capping agent used is not particularly limited and, for example, carboxylic acid anhydrides and monoamines can be quoted. Such capping agents are known and easily available. Concretely, as a carboxylic acid anhydride, for example, anhydrous phthalic acid, benzophenone dicarboxylic acid anhydride, diphenylether dicarboxylic acid anhydride, diphenyl dicarboxylic acid anhydride, diphenyl sulfone dicarboxylic acid anhydride, naphthalene dicarboxylic acid anhydride, anthracene dicarboxylic acid anhydride; and as a monoamine, aniline, o-toluidine, m-toluidine, p-toluidine, 2,3-xylidine, 2,6-xylidine, 3,4-xylidine, 3,5-xylidine, 2-aminophenyl phenylether, 3-aminophenylether, 4-aminophenyl ether, 2-aminobenzophenone, 3-aminobenzophenone, 4-aminobenzophenone, 2-aminophenyl phenylsulfone, 3-aminophenyl sulfone, 4-aminophenyl sulfone, α-naphthyl amine, β-naphthyl amine, 1-aminoantracene and 2-aminoantracene etc. can be quoted.

Additionally, using a dicarboxylic acid dianhydride having a triple bond in molecule or a monoamine as a polymer molecule end-capping agent, it is possible to obtain a thermoplastic polyimide or imide oligomer characterized in showing thermosetting properties in a high temperature region. Namely, in the case of using a usual capping agent, the thermoplastic polyimide or imide oligomer of the present invention not always shows thermosetting properties even if it is heated, but in the case of using the said capping agent, the resulting thermoplastic polyimide or imide oligomer shows the thermosetting properties at a certain temperature or higher. In other words, it would be a polyimide or imide oligomer which is so far nonexistent and having both of thermoplasticity and thermosetting properties such that it shows thermoplasticity (i.e. high processing characteristics) up to a certain temperature and it is thermally hardened higher than the certain temperature, which polyimide or imide oligomer has not been present until now.

For example, using a dicarboxylic acid anhydride represented by formula (IV)

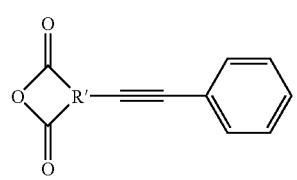

(IV)

in which R' is a trivalent organic group having 6 to 30 carbon atoms which is a monocyclic aromatic group, condensed polycyclic aromatic group or a non-condensed polycyclic aromatic group where the aromatic groups are linked with each other directly or through a cross-linking member; and any aromatic ring in formula (IV) may be substituted or unsubstituted, it is possible to obtain a novel thermoplastic polyimide or imide oligomer which shows thermosetting properties at 300° C. or higher, preferably 200° C. or higher.

As the dicarboxylic acid anhydride of formula (IV) can be quoted as 4-phenylethynyl anhydrous phthalic acid, 3-phenylethynyl anhydrous phthalic acid, phenylethynyl naphthalene dicarboxylic acid anhydride, phenylethynyl diphenyl tetracarboxylic acid anhydride, phenylethynyl diphenylether dicarboxylic acid anhydride, phenylethynyl benzophenone dicarboxylic acid anhydride, phenylethynyl diphenyl sulfone dicarboxylic acid anhydride, phenylethynyl anthracene dicarboxylic acid anhydride and those in which the aromatic ring is substituted. These may be used singly or mixed with two kinds or more. Further, one or two kinds of the said sealing agents which do not no contain any carbon-carbon triple bond, such as anhydrous phthalic acid, benzophenone dicarboxylic acid anhydride, diphenylether dicarboxylic acid anhydride, diphenyldicarboxylic acid anhydride, diphenylsulfone dicarboxylic acid anhydride, naphthalene dicarboxylic acid anhydride and anthracene dicarboxylic acid anhydride can be used in combination.

Further the amount of the capping agent to be used is preferably 1 to several times as much as the difference in used mol number between the acid component and diamine component, of monoamine or dicarboxylic acid anhydride.

Next, the process for preparing the polyimide and imide oligomer of the present invention is described.

In the preparation of the polyimide and imide oligomer, at first, the corresponding polyamic acid and amic acid polymer are prepared. The synthetic reaction of the polyamic acid and amic acid oligomer is not specifically limited and may be a known method and usually carried out in solvents. The solvents used in this reaction are not particularly limited as long as the solvent is inert to the reaction, such as N,N-dimethyl formamide, N,N-dimethyl acetoamide, N-methyl-2-pyrolidone, cresol acid and dimethyl sulfoxide, which can be used singly or in a mixed state, in a solute concentration of from 5 to 80%. Especially preferable examples are N,N-dimethyl acetoamide and N-methyl-2-pyrolidone. Further, to these solvents, solvents such as benzene, xylene, hexane, chlorobenzene, tetrahydrofurane, 1,4-dioxane, acetonitrile and benzonitrile may be used by mixing in an optional proportion.

The polymerization degrees of the resulting polyamic acid and amic acid oligomer are preferably from 2 to 600. In this connection, the polyimide and imide oligomer have the same polymerization degrees as the former polyamic acid and amic acid oligomer. The polymerization degree can be determined based on the weight average molecular weight as measured by GPC.

The adjustment of the polymerization degree can be controlled by adjusting the molar ratio of the monomer component similar to that of usual condensed polymerization polymers. For example, 0.8 to 1.2 mol of the diamine component is used based on 1 mol of the acid component and preferably, 0.9 to 1.1 mol of diamine is used based on 1 mol of the acid component.

The resulting polyamic acid preferably has a viscosity of a solution thereof in a range from 0.2 to 200000 mPa·S. The viscosity is determined by using a rotational viscometer (B type viscometer) in the viscosity measuring method based on the Japanese pharmacopoeia.

The imidization reaction is carried out by subjecting the polyamic acid and amic acid oligomer prepared by the above method to dehydration with a known method. For example, in the chemical imidization method, the polyamic acid or amic acid oligomer prepared in the above reaction is mixed with one or two or more of dehydrating agents which is not particularly limited to, such as acetic anhydride, trifluoro acetic anhydride, polyphosphoric acid, phosphorus pentaoxide, phosphorus pentachloride and thionyl chloride, to perform chemical dehydration. In the chemical imidization method, the reaction conditions are not particularly limited and known conditions are applicable. Further, as the thermal imidization method, (1) a method of applying the polyamic acid or amic acid oligomer prepared in the above reaction on a glass plate or the like, heating and evaporating the solvent and simultaneously closing the ring with dehydration to obtain a film-like polyimide or imide oligomer, and (2) a method of adding a solvent to the reactor, heating, removing the water generated by dehydration from the system, and preparing a deposited polyimide powder or imide oligomer powder with filtration. The solvent used herein is not particularly limited and is quoted as aromatic hydrocarbons and halogenated aromatic hydrocarbons such as benzene, toluene, orthoxylene, methaxylene, paraxylene, chlorobenzene, dichlorobenzene, trichlorobenzene, bromobenzene, dibromobenzene, chlorotoluene and bromotoluene. These solvents can be used singly or in a mixed state of two or more kinds. The amount of these solvents used is not particularly limited. The reaction conditions for the thermal imidization method are not particularly limited and known conditions are applicable. Usually, the reaction conditions vary depending on the boiling point of the solvent to be used. Practically, the temperature is from 100° C. to 400° C., the reaction pressure is ordinary pressure, and the reaction time is from 0.5 hr to 24 hrs. Further, the reaction may be carried out in an atmosphere of an inert gas such as nitrogen, argon or helium in accordance with necessity. Furthermore, the chemical imidization method and the thermal imidization method may be carried out in combination.

With regard to the polyimide and imide oligomer capable of having the thermosetting properties, the thermosetting polyimide and imide oligomer can be prepared by heating in a high temperature region, for example, by subjecting the resulting film-like polyimide and imide oligomer, polyimide powder and imide oligomer powder, polyamic acid solution and amic acid oligomer solution, or polyimide suspension and imide oligomer suspension prepared in the above manner to heat treatment. A part of the polyimides and a part of the imide oligomers may be a polyamic acid and amic acid oligomer, respectively. When the thermal imidization is carried out, the heat treatment can be carried out simultaneously.

The heat treatment temperature, which varies depending to the kinds of the polyimide and imide oligomer or polyamic acid and amic acid oligomer, is from 100° C. to 500° C., preferably 250° C. to 400° C. The heat treatment time, which varies depending to the kinds of the polyimide or polyamic acid and the heat treatment temperature, is generally from the time that the thermal cross-linking reaction of a carbon-carbon triple bond is sufficiently completed to the time that the polyimide and polyamic acid are not thermally modified. Specifically, the heat treatment time is from 1 min to 1 hr.

EXAMPLE

Hereinafter, the present invention is further described with reference to the following examples, comparative examples and referential examples, but the present invention is not limited to the examples described below.

Examples 1 to 4 relate to polyimides having thermoplasticity and thermosetting properties, and Examples 5 and 6 relate to polyimides having only thermoplasticity.

Example 1

To a flask, 5.8921 g (0.01362 mol) of 4,4'-bis(4-aminophenoxy)diphenyl sulfone, 3.6058 g (0.01162 mol) of 2,2',3,3'-oxydiphthalic acid dianhydride, 0.9929 g (0.004 mol) of 4-phenylethynyl phthalic acid anhydride and 25 mL of N-methyl-2-pyrolidone were fed and stirred in a stream of nitrogen at room temperature for 12 hrs to prepare a terminal phenylethynyl group-containing amic acid oligomer having a solute concentration of 30%. This amic acid oligomer had a viscosity, as measured by a B type viscometer manufactured by Tokyo Keiki Co., Ltd., of 35000 mPa·s. A half amount of a N-methy-2-pyrolidone solution of the amic acid oligomer was subjected to casting on a glass plate and heated at 100° C., 225° C. and 350° C. respectively for 1 hr to prepare a film having a thickness of 30 μm. The DSC measurement of the polyimide film was carried out and the glass transition temperature was observed at 265° C. With regard to the polyimide film, a 5% weight loss measured with TGA was 519.2° C. With regard to the polyimide film, the coefficient of thermal expansion measured with TMA was 46.8 ppm in a temperature range of from 50 to 250° C. To the remaining N-methyl-2-pyrolidone solution of the amic acid oligomer, 50 mL of ortho-xylene was added and heated at 165° C., and thereby dehydration ring closure imidization was carried. After cooling, the resulting solution was injected into methanol and the precipitated crystal was corrected with filtration and cleaned with water and methanol. Thereafter, vacuum drying thereof was carried out and thereby a terminal phenylethynyl group-containing imide oligomer powder was prepared. The DSC measurement of the polyimide oligomer powder was carried out, and the glass transition point was observed at 216° C. and the exothermic peak caused by crosslinking of the terminal phenylethynyl group was observed at a temperature of near 360° C. On the other hand, the heat-cured polyamide prepared by heat-treating the polyimide oligomer powder at 380° C. for 1 hr was subjected to DSC measurement. The glass transition point was observed at 264° C. and an exothermic peak was not observed in the temperature side higher than 264° C. Furthermore, the polyimide powder prepared before the heat-treatment is soluble in a polar solvent such as NMP, DMAc, DMF or the like, but the polyimide prepared after the heat-treatment was insoluble in such solvents.

Examples 2 to 4

In each example, a polyimide was prepared in the same manner as Example 1 except for using the components as shown in Table 1. The results are also shown in Table 1.

TABLE 1

| | Acid anhydride | Diamine compound | End sealing agent | Glass transition temperature | | Thermal decomposition temperature (5%) | Solubility in solvent | |
|---|---|---|---|---|---|---|---|---|
| | | | | before heat treatment | after heat treatment | | before heat treatment | after heat treatment |
| Example 2 | 3-ODPA | TPE-R | PEPA | 174.0 | 218.4 | 525.0 | ○ | x |
| Example 3 | 3-ODPA | BAPP | PEPA | 169.9 | 215.1 | 496.4 | ○ | x |
| Example 4 | 3-ODPA | BAPB | PEPA | 202.2 | 249.2 | 539.6 | ○ | x |

3-ODPA: 2,2',3,3'-oxydiphthalic acid dianhydride
TPE-R: 1,3-bis(4-aminophenoxy)benzene
BAPP: 2,2-bis[4-(4-aminophenoxy)phenyl]propane
BAPB: 4,4'-bis(4-aminophenoxy)biphenyl
PEPA: 4-phenylethynyl phthalic acid anhydride Example 5

In an atmosphere of nitrogen, 4.105 g (0.01 mole) of bis[4-(4-aminophenoxy)phenyl]propane was dissolved in 40 g of N-methylpyrrolidone. Next, 3.102 g (0.01 mole) of 2,2',3,3'-oxydiphthalic acid anhydride was reacted with depressing the temperature elevation caused by exothermic reaction and thereby a viscous polyamic acid was prepared. The polyamic acid had a viscosity, as measured by a rotational viscometer (B type viscometer: manufactured by Tokyo Keiki Co., Ltd) in the viscosity measurement method based on the Japanese Pharmacopaeia, of 78000 mPa·s. The polyamic acid thus prepared was applied on a glass substrate to form a coated film and the coated film was dried in a hot air dryer at 120° C. for 15 min and further dried with heat at 250° C. for 15 min to prepare a polyimide film having a thickness of 20 μm.

Example 6

In this example, 2.923 g (0.01 mole) of 1,3-bis(3-aminophenoxy)benzene was dissolved in 27 g of N-methyl pyrrolidone in an atmosphere of nitrogen. Next, 3.071 g (0.01× 0.99 mole) of 2,2',3,3'-oxydiphthalic acid anhydride was reacted with depressing the temperature elevation caused by exothermic reaction and then 0.095 g (0.01×0.02 mole) of anhydrous phthalic acid anhydride was added and reacted with stirring for 4 hr to prepare a viscous polyamic acid. The polyamic acid had a viscosity, as measured by a rotational viscometer (B type viscometer: manufactured by Tokyo Keiki Co., Ltd) in the viscosity measurement method based on the Japanese Pharmacopaeia, of 30000 mPa·s. To the polyamic acid thus prepared, 30 g of o-dichlorobenzene was added and subjected to dehydration ring closure reaction at 200° C. for 6 hr and thereby polyimidized. After cooling, the resulting polyimidized mixture was introduced into 100 g of methanol to prepare a pale yellow powder.

Example 7

Adhesion Test

The polyimide film obtained in Example 5 was contact bonded with heat to an electrolytic copper foil at 210° C. at 4 Kg/cm² for 20 sec. The 90° peeling adhesive strength to the copper foil measured with IPC-TM-650 method 2, 4 and 9 was 2.18 Kgf/cm.

The polyimide powder prepared in Example 6 was contact bonded with heat to an electrolytic copper foil at 210° C. at 4 Kg/cm² for 60 sec. The 90° peeling adhesive strength to the copper foil measured with IPC-TM-650 method 2, 4 and 9 was 1.92 Kgf/cm.

EFFECT OF THE INVENTION

The thermoplastic polyimide of the present invention has excellent melt properties at a relatively low temperature, excellent melt flow properties and good processing characteristics at a low temperature. Further, the thermosetting polyimide prepared by crosslinking or hardening the thermoplastic polyimide with heat treatment has excellent heat resistance.

The invention claimed is:

1. A thermoplastic imide oligomer obtained by polymerizing an acid component and a diamine component characterized in that at least 30 mol % of the acid component is an aromatic tetracarboxylic acid dianhydride represented by formula (I);

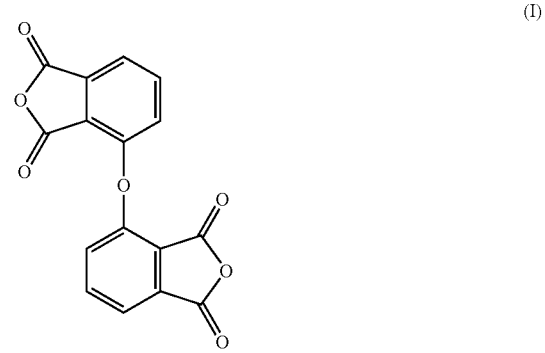

or its derivative, and that the terminal of imide oligomer molecule is capped by two or more times of moles of the difference in mole number between the acid component used and the diamine component used, of a dicarboxylic acid anhydride having a triple bond in the molecule represented by formula (IV);

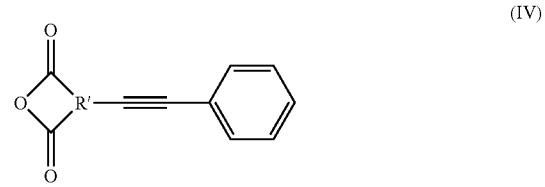

in which R' is a trivalent organic group having 6 to 30 carbon atoms, which is a monocyclic aromatic group, a condensed polycyclic aromatic group or a non-condensed polycyclic aromatic group where aromatic groups are linked each other directly or through a linking member, and any of aromatic ring in formula (IV) may be unsubstituted or substituted.

2. The thermoplastic imide oligomer according to claim 1 wherein at least a part of the diamine component is a diamine represented by formula (II);

in which R is a substituted or unsubstituted bivalent organic group having an aromatic and/or aliphatic ring(s).

3. The thermoplastic imide oligomer according to claim 2 wherein R is a bivalent organic group having an aromatic ring(s).

4. The thermoplastic imide oligomer according to claim 3 wherein R has at least three aromatic rings.

5. The thermoplastic imide oligomer according to claim 1 wherein the acid component further comprises an aromatic tetracarboxylic acid dianhydride represented by formula (III);

in which Ar is a quadrivalent organic group having an aromatic ring, or its derivative, which is different from the aromatic tetracarboxylic acid dianhydride represented by formula (I) and the derivative thereof.

6. A thermo setting imide oligomer obtained by heat-treating the imide oligomer as claimed in claim 1.

7. A solution or suspension containing the imide oligomer as claimed in claim 1.

8. An amic acid oligomer, which is a precursor of the imide oligomer as claimed in claim 1.

9. A solution or suspension containing the amic acid oligomer as claimed in claim 8.

10. A thermosetting imide oligomer obtained by imidizing the amic acid oligomer as claimed in claim 8.

11. A polyimide obtained by heat-treating the imide oligomer as claimed in claim 1.

* * * * *